May 28, 1946.  A. T. HILLBERG  2,401,071
COLLET CHUCK
Filed May 1, 1944  2 Sheets-Sheet 1

INVENTOR.
ALBERT T. HILLBERG
BY
Irving F. Goodfriend
ATTORNEY

May 28, 1946.  A. T. HILLBERG  2,401,071
COLLET CHUCK
Filed May 1, 1944   2 Sheets-Sheet 2

INVENTOR.
ALBERT T. HILLBERG
BY
Irving F. Goodfriend
ATTORNEY

Patented May 28, 1946

2,401,071

UNITED STATES PATENT OFFICE 2,401,071

COLLET CHUCK

Albert T. Hillberg, Orange, N. J., assignor, by mesne assignments, to Miller N. Vliet, Hackettstown, N. J.

Application May 1, 1944, Serial No. 533,481

2 Claims. (Cl. 279—51)

The present invention relates to a tool or work holder of the type known in the art as a collet chuck.

The collet chuck of the present invention, although primarily designed and constructed for use in a conventional drill press may also be used in a lathe or other machine tool.

The present invention contemplates the provision of a collet chuck which permits the work or tool to be inserted for operation into the chuck and their removal therefrom without stopping the machine tool to which the chuck is applied in order to accomplish this.

The present invention further contemplates the provision of a collet chuck of construction such that the work or tool held therein is relieved of any radial and thrust load and so revolves true to make possible precision drilling, turning, reaming and the like machine tool operations on a production scale without detracting from the precision required in the production of the work.

The present invention still further contemplates the provision of a collet chuck with which drill presses to which it is applied may be used not only for turning, drilling and the like operations but also to duplicate the type of work heretofore turned out only on Swiss automatic machines.

Figure 1:
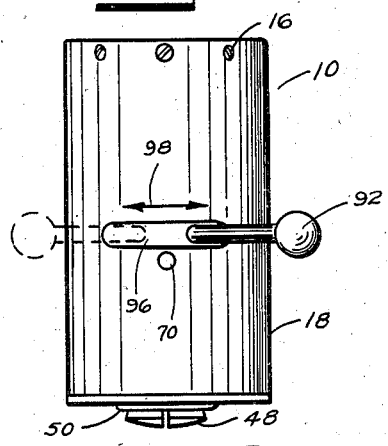

These, other and further objects, uses and advantages of the present invention will be clear from the description which follows and the drawings appended thereto in which Fig. 1 is a perspective view of a collet chuck according to my invention.

Figure 3:
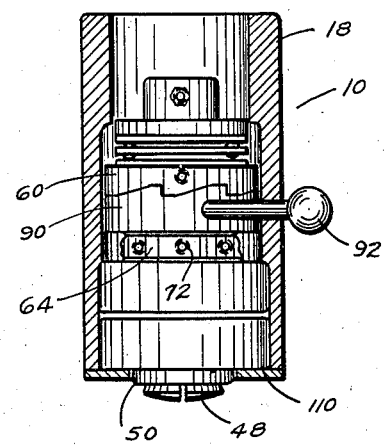
Figure 2:
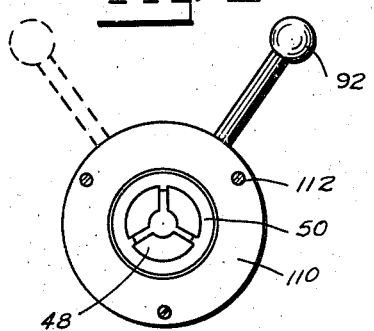
Figure 6:
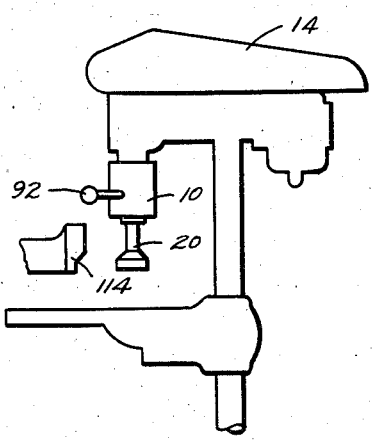
Figure 4:
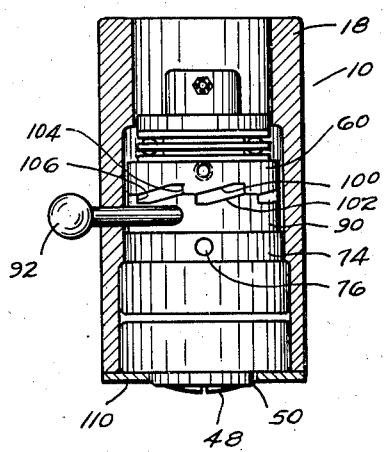
Figure 5:
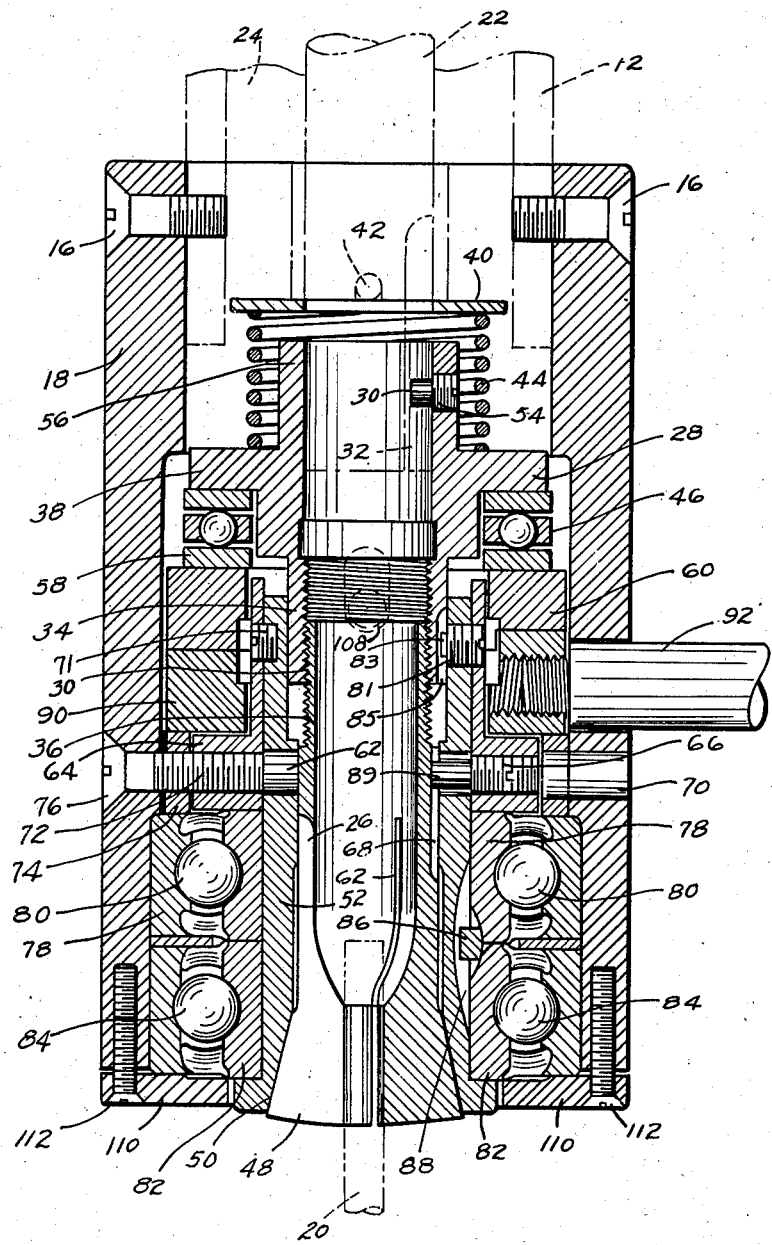

Fig. 2 is a front elevation thereof, the housing being broken away to show the collet locking cams in normal position for the insertion of the work or the tool into the opened jaws of the collet Fig. 3 is a view similar to Fig. 2, with the locking cams in position for closing the collet jaws in the work or tool holding position Fig. 4 is a vertical section of a collet chuck according to my invention, the jaws locked on a piece of work held therein Fig. 5 is a schematic elevation of a drill press modified and using my collet chuck to form the illustrated work from a straight rod.

Referring now to the drawings, the collet chuck 10, according to my invention, and which for purposes of illustration, is secured to the quill 12 of a drill press head 14, as by means of the countersunk set screws 16, which secure the housing 18 of my collet to the quill.

It will be noted that the housing 18 does not revolve but is stationary so that the work 20 held therein may be raised and lowered along with the quill but which construction nevertheless permits the chuck to be rigidly held in place so that the work will be accurately formed.

The spindle 22 of the drill press, or other machine tool, which rotates in the sleeve 24 of the machine, is secured to the collet 26 by means of the connector or draw in unit 28.

The connector or draw in unit is tapped at its upper end to receive the set screw 30 which engages the spindle 22 at the groove 32 therein and thereby secures the connector or draw in unit to the spindle.

The lower sleeve 34 of the connector or draw in unit 28 is internally threaded so that the upper threaded end 36 of the collet 26 may be screwed thereinto to operatively connect the collet to the spindle and for the purposes of adjustment that will be hereafter explained.

Between the shoulder 38 of the connector or draw in unit 28 and the plate or cap 40, upward movement of which plate or cap is restrained by the lug or pin 42 on the spindle 22, I arrange the normally expanding spring 44, which normally pushes the shoulder 38 downward to force the collet 26 a sufficient distance out from the chuck.

It will be recognized that the spring 44 normally pushes the connector or draw in unit 28 down against the thrust bearing 46 thereby forcing the collet jaws 48 out of the tapered shoulders 50 of the holding sleeve 52, the function of which I shall subsequently explain, to permit the jaws 48 of the collet to assume a normal open position out of the chuck.

The connector or draw in unit 28 is secured to the spindle 22 to rotate with it, by means of a set screw 30, as previously pointed out, the head 54 of which is countersunk and screwed into the upper sleeve 56 of the connector unit, the set screw 30 correspondingly moving in the groove 32 as the connector or draw in unit is moved up or down to arrange the collet 26 in jaw opening or jaw closing position, respectively by the spring 44 and by the manually operated means which I shall hereinafter explain.

It will be recognized that the thrust bearing 46 that is arranged between the underside of the shoulder 38 and the washer 58, which latter rests on the upper cam section 60, will take up any thrust that may be imparted by the action of the spring 44 to the elements therebeneath and which further serves to prevent friction between the rotating connector or draw in unit and the cam section 60, the function of which latter will become apparent.

The collet 26 is of the conventional type and is provided with the somewhat resilient, tapered jaws 48 which are separated by the elongated slots 62 and which jaws when brought into engagement with the tapered shoulder 50 of the jaw closing sleeve 52, which is fixed in position in the housing, are closed in the manner which I shall describe, to firmly grip or clamp the piece of work 20 and hold it rigidly in place.

These collets come in standard sizes that vary from each other one-thirty-second of an inch, the jaws 48 tapering inwardly and upwardly, the slots 62 extending up through the collet to permit the jaws to be moved toward and spring away from each other to open and close the collet.

It will of course be recognized that the piece of material, such as a metal rod, from which the work 20 is formed by the tool, will itself vary in diameter some few thousandths of an inch from another metal rod or the like from which the same work piece is to be formed, depending on the tolerance to which the metal rods or the like have been held in their manufacture.

The internal diameter of the collet is adjusted to the size of the work piece to be held in the chuck by securing the collet in such position in the housing so that when the collet is drawn into the chuck, the jaws 48 thereof engage the shoulder 50 of the locking sleeve 52 to be closed by it on the work.

To accomplish this, the collet is screwed into the lower sleeve 34 of the connector or draw in unit 28 to the position therein at which the jaws 48 will be brought into engagement with the shoulder 50 whereat the work is firmly held.

Standard collets, which are used in my invention, have a positioning groove on the shank thereof, which is used to fix the collet in selected jaw closing position for the work piece that is to be machined.

After it has been positioned in the chuck, affixed to the machine tool which in the illustration of my invention is a drill press, as aforesaid, in order to prevent the collet from being unscrewed, that is backed off from the connector or draw in unit 28 due to the operation of the machine, the collet is locked against rotation in the sleeve 34 by the set screw 66, which enters the groove 68 on the collet and which is accessible from the outside of the housing 18 through the opening or window 70 therein.

The collet jaw closing sleeve 52, because of structural reason is relatively thin so that the openings 62 therein are not threaded for engagement by the set screw 66 which is passed through one of these openings. I therefore provide a strengthening sleeve 64 which embraces and is secured to the closing sleeve 52, by means of the connecting countersunk set screw 71.

The sleeve 52 is provided with a plurality of the radially spaced openings 62 (I have found eight such openings as satisfactory), which are suitably positioned therein to register with a corresponding opening 72 on the strengthening sleeve 64 (which openings are also eight in number).

The strengthening sleeve 64 is fixedly positioned against movement along the axis of rotation between the upper ball bearing 80 and the stationary cam section 90, which latter is supported on the ring 74 carried in the housing 18 and secured thereto by means of the countersunk screw 76. The locking sleeve 52 and connected strengthening sleeve 64 are rotated on the inner movable race 78 of the upper ball bearing 80 by means of the spindle 22 into a selected position whereat the opening 62 on the sleeve 52 and corresponding opening 72 on the sleeve 64 that are aligned with the positioning groove on the collet register with the opening or window 70 in the housing in that position at which the locking sleeve closes the collet jaws 48 tightly on the work when it and the draw in unit are manually brought into locking position in the manner that will be described.

The closing sleeve 52 and strengthening sleeve 64 assembly are locked to the connector or draw in unit 28 by means of the countersunk screw 81, the undercut end 83 of which is positioned in the groove 85 of the unit 28.

The threaded openings 72 are provided in the relatively thick collar 87 of the sleeve 64, the undercut end 89 of the set screw 66 which has been screwed in one of the openings 72 passing through the corresponding opening 62 in the sleeve 52 into the collet groove 68.

Since the sleeve 52 is positioned some distance inwardly within the chuck, the opening 72, relatively close to the window 70, serves to make easier the alignment of the locating groove on the collet at the window 70, the position of the groove relative to a marked jaw, which is readily visible, being known.

Upon satisfactorily positioning the collet at the desired position within the housing and locking it against rotation on the connector or draw in unit 28 by means of the set screw 66, as stated, the machine tool is ready for use.

For operation, the locking sleeve 52 is connected to the inner race 78 of the upper ball bearing 80 and to the inner movable race 82 of the lower ball bearing 84 by means of the finger 86 extending into the groove 88 of the locking sleeve 52.

It will be recognized that the inner diameter formed when the collet jaw 48 is closed by the tapered shoulders 50 of the locking sleeve 52, depends on the position in the chuck to which the collet has been locked upon the connector or draw in unit by the locking and strengthening sleeve assembly; the higher the position of the collet in the chuck, the smaller will be the opening of the collet jaw.

It will now be apparent that the jaw is in open position when the collet is moved out of the chuck as illustrated in Fig. 2, in which position the tapered shoulders 50 of the locking sleeve 52 do not engage and force the tapered elements of the collet jaws 48 toward each other to close it.

Ordinarily the spring 44 forces the connector or draw in unit downward out of the locking sleeve 52 to position the collet away therefrom and thereby normally hold open the jaws so that the work may be inserted thereinto.

It will also be apparent that the collet jaws will be closed by the action thereon of the tapered shoulders 50 when the collet is drawn into the chuck, as illustrated in Fig. 3.

To accomplish this locking action of the collet jaws, I arrange in the housing the two collet controlling cam sections 60 and 90. The cam section 90, which has the control ball handle 92, is supported on the ring 74, which in turn rests on the stationary outer race 94 of the upper ball bearing 80.

The cam section 90 is operatively moved back and forth about the axis of rotation by means of the handle 92, which moves in the slot 96 formed in the housing 18, in the direction of the arrow 98 (Fig. 1), to open (movement clockwise) and close (movement in a counterclockwise direction) the collet jaws 48.

Both cam sections 60 and 90, which are cylindrical in form, have cam surfaces 100 and 102, which in normal collet open position, as illustrated in Fig. 2, are unseparated and dovetail or mesh together, the shoulders 104 and 106 brought into engagement when the collet jaws are opened and serving to limit movement of the sections in a clockwise direction.

The cam section 90 may be rotated by the handle 92 but cannot be moved downward because that cam section rests on the stationary ring 74.

The upper cam section 60 is prevented by the set screw 108 from rotating under the action of lower cam section 90, as it is moved counterclockwise into jaw closing position, the handle assuming the position at the end of its stroke illustrated by the dotted lines of Fig. 1, but the section 60 must therefore move upward (Fig. 3) by the interengagement of the one cam surface 102 with the other cam surface 100.

Movement of the lower section 90 in a clockwise direction is limited by the engagement of the handle 92 with the other end of the slot 96; I have found that rotation of the cam section 90 one-fifth of a revolution is sufficient to operatively separate the cam sections so that they will satisfactorily function to close the collet jaws.

Upward movement of the section 60 forces the thrust bearing 46 to push up the connector or draw in unit 28 against the compression tension of the spring 44, which movement draws the collet in against the shoulder 50 of the collet closing sleeve 52 to thereby close the jaws 48 on any workpiece that has been inserted therein.

To open the collet jaws 48, the handle 92 is returned (in a clockwise direction) to its normal position in the slot 96, the cam surface 102 releasing the cam surface 100 as they are dovetailed or meshed together, thereby permitting the upper cam 60 and the connector or draw in unit 28 to be returned to normal position by the thus released and therefore expanding spring 44. This action moves the collet out of the holding sleeve away from the shoulder thereof thereby permitting the collet jaw to open and release the work.

The elements comprising my chuck are held in the housing 18 by means of the cover or cap 110 which is secured to the housing as by the countersunk screws 112 and which cover or cap is open at its center to permit the collet to be forced down out of or drawn up into the holding sleeve to open and close the collet.

It will now be recognized that the work or tool is held in a collet that turns in its own heavy duty bearings constructed to relieve it from and carry both radial and thrust loads, such as the ball bearings 80 and 84, a construction which therefore insures that the work or tool held in the chuck will revolve unvaryingly true to allow precision drilling, turning, reaming and other machine tool operations not heretofore ordinarily attainable with production tools available. The collet of the present invention makes it possible to form work of the shape of the piece 20 in a drill press heretofore formed in a lathe.

In practice, the stock is inserted into the open collet projecting out of the chuck, which operation is performed while the machine is in operation. Since the collet is open it will not firmly grip the stock though there will be sufficient friction between it and the stock to hold it.

When the stock is inserted into the collet jaw, the jaw is then closed by moving the ball handle into collet closing position, whereupon the tool 114 is moved against the rotating stock to cut it to form the piece illustrated.

With the chuck constructed according to my invention, it will be apparent that work that was heretofore accomplished on a lathe or the like can now be turned out in a drill press.

Further with the chuck of my invention, a straight true hole may be drilled by bringing the rotating work stock or piece against a stationary drill arranged on the table of a drill press, thereby insuring that the drilled work will be held to a close tolerance.

It will be further apparent that the collet chuck of my invention permits the stock or work to be inserted therein and withdrawn therefrom without requiring the machine to be stopped for this purpose.

It will still further be recognized that the collet chuck according to my invention permits the rapid production of precision work while using only relatively unskilled labor.

While I have illustrated a specific embodiment of my invention, I do not intend to be limited to the details shown but intend to claim the invention as broadly as the appended claims and the state of the art permit.

I claim:

1. A chuck comprising a stationary casing to be secured to a machine tool having a driven power shaft, a connecting member, one end of said member to be secured to the power shaft and the other end of said member being threaded, a shoulder on said member intermediate the ends thereof, a cam comprising an upper and lower section each section having a cam surface in normal position dovetailing against the cam surface of the other section, said lower section having a handle accessible on the outside of the chuck and rotatable from said normal position to a second position, the cam surface on said lower section riding against the cam surface of said upper section to raise the upper section from the lower section, a thrust bearing between the shoulder and the upper cam section, a spring normally expanding against the shoulder and to be compressed upon raising the upper cam section, a sleeve having a tapered shoulder, a collet secured to the threaded end of the connecting member and having jaws engaging the tapered shoulders upon raising the upper section to close said jaws and radial and thrust bearings in the casing about said sleeve.

2. In a chuck, a housing to be secured to a machine tool having a rotating shaft, a collet having tapered gripping jaws normally open, a tapered sleeve, said jaws closed by said tapered sleeve upon positioning the jaws inward of the sleeve, means for connecting the collet to the rotating shaft of the machine tool, tension means engaging the connecting means to normally hold the collet jaws out of the tapered sleeve, interengaging cam sections having normally dovetailing surfaces, one of said cam sections in engagement with the connecting means and movable away from the other cam section against the tension of the tension means upon rotating one of the dovetailing surfaces upon the other dovetailing surface to position the collet jaws inward of the sleeve, said tapered sleeve having spaced means for selectively positioning the tapered sleeve in the chuck and on the collet and a strengthening sleeve having spaced means thereon to engage the positioning means on the tapered sleeve to fix the collet on the tapered sleeve in the selected position in the chuck.

ALBERT T. HILLBERG.